United States Patent Office 3,801,693
Patented Apr. 2, 1974

3,801,693
METHOD OF COLORING LOW PROFILE REINFORCED UNSATURATED POLYESTERS
John P. Stallings, Mentor, Gerald S. Schrag, Painesville, and John R. Semancik, Mentor, Ohio, assignors to Diamond Shamrock Corporation, Cleveland, Ohio
No Drawing. Filed Sept. 7, 1971, Ser. No. 178,465
Int. Cl. B29c 1/04, 9/00, 19/00
U.S. Cl. 264—246                            7 Claims

ABSTRACT OF THE DISCLOSURE

A colored thermoplastic resin is applied in film form or as powder onto the surface of an uncured formulated low profile polyester sheet and is then bonded thereto with heat, forming a laminate of the cured polyester with continuous, adherent overlayers of the colored thermoplastic resin. A method for coloring polyester surfaces after molding with pigmented thermoplastic resin powder is also described.

BACKGROUND OF THE INVENTION

1. Field of the invention

This invention relates to a method for coloring reinforced unsaturated polyester compositions and more particularly relates to a method for coloring such polyester compositions to prevent color-blotching and/or mottling in the polyester with curing.

2. Description of the prior art

Unsaturated polyester resins containing fillers and reinforcing agents have, as a class, enjoyed ever increasing commercial acceptance because of their desirable physical and chemical properties in end-use markets. A substantial percentage of these thermosetting resin materials produced to date has been utilized in molding applications—either by transfer, compression, or injection molding techniques or in mat or in preform molding operations.

In commercial practice, the reinforced unsaturated polyester molding compositions themselves may be varied somewhat in composition, as for example, in the type of reinforcing agents incorporated therein, depending upon the particular method of fabrication employed and/or the specific properties required in the finished moldings. Also, the procedure for formulating the polyester, composition will be varied depending upon the molding technique employed, i.e., whether the polyester is molded via the mat, preform, premix or sheet molding compound method. Of these molding techniques, those utilizing premix and sheet molding compound are particularly advantageous because of their economy, ease of operation, and greater adaptability for preparing moldings of widely divergent configuration.

In the sheet molding technique, the reinforced thermosetting composition is used in sheet form, designated generally as sheet molding compound and conveniently herein as SMC. This compound is prepared by mixing and then metering a thermosetting resin liquid or paste composition onto a carrier film, typically polyethylene. Chopped reinforcement (usually glass fibers or mat) is deposited onto the resin composition on the carrier film. The reinforcement-resin layer is then covered with a similar resin-coated film. Thereafter, this "sandwich" sheet is passed through a series of rollers to achieve "wet out" of the glass reinforcement and is then fed to a molding station or is rolled into coils for storage prior to use. Prior to molding operations, the carrier film usually is removed from the SMC.

Known polyester sheet molding compounds, while generally performing satisfactorily in SMC molding operations heretofore, have nevertheless exhibited significant deficiencies. For example, parts molded from these materials are subject to shrinkage and warpage upon cooling and oftentimes exhibit surface waviness, roughness, and sink marks. These surface irregularities are extremely objectionable for many end-use applications.

The aforesaid deficiencies of long known, conventional polyester compositions largely have been overcome by the development of polyester-based thermosetting molding compositions which also contain a thermoplastic polymer additive, e.g., polymethyl methacrylate, polystyrene and the like. Parts molded from these modified polyester formulations are reported to exhibit much improved surface characteristics and dimensional stability by comparison to moldings fabricated from the earlier unmodified materials.

Unsaturated polyester compositions incorporating thermoplastic polymer additives have come to be known generally in the art as "low profile" polyesters since they produce moldings with extremely low microinch ratings as measured, for example, with a Bendix Microcorder. Low microinch readings indicate molding surfaces with little roughness, waviness, etc.

While "low profile" polyester compositions consistently will produce molded parts of good surface smoothness and dimensional stability, highly colored formulations thereof, especially those containing bright or darker pigments, dyes, etc., nevertheless will oftentimes yield moldings which are severely color-blotched and/or mottled in appearance. Such moldings are, of course, objectionable in some commercial applications, e.g., in the automotive industry and in fabricating appliance housings.

SUMMARY OF THE INVENTION

It is an object of this invention, therefore, to provide molded parts from a reinforced polyester composition, which molded part surfaces are uniformly colored as well as being smooth-surface and dimensionally stable. It is another object of this invention to provide a method for preparing from a low profile polyester composition, molded parts which are dimensionally stable, and have a uniformly colored smooth surface with no evidence of color-blotching and/or mottling. It is still another object of this invention to provide homogeneously colored, smooth-surfaced, reinforced molded parts from low profile polyester sheet molding compound.

In accordance with these objects, the present invention comprises in one embodiment, first forming a composite sheet comprising a formulated reinforced unsaturated low profile polyester composition sandwiched between colored thermoplastic polymer films, the coloration in said thermoplastic polymer films being that desired in the finished molded article. Thereafter, appropriate portions of the reinforced polyester-colored thermoplastic film laminate are heated in a mold under pressure for a sufficient time to cure the resin in the composition. The reinforced thermosetting molded article obtained is smooth-surfaced, exhibits good dimensional stability and is homogeneously colored with no evidence of color-blotching or mottling.

It is to be understood that the terms "film" and "sheet" as may be used interchangeably herein are each intended to designate shaped, flat thermoplastic polymer structures measuring more or less than 10 mils in thickness.

Another embodiment of this invention comprises applying a colored thermoplastic polymer powder onto the surface of a formulated reinforced unsaturated low profile polyester composition and then curing the coated polyester with heat and pressure to obtain the desired homogeneously colored molded article.

Still another embodiment of the present invention comprises first conventionally fabricating a molded article from an uncolored reinforced unsaturated polyester composition as, e.g., a premix formulation or SMC. At the end of the molding cycle, the fabricated molding is removed from the forming mold hot and is contacted with a colored thermoplastic resin powder which is being agitated, e.g., in a fluidized resin coating bed. The colored resin powder granules adhere to the heated molding surface and fuse thereon as a continuous colored coating.

By either of the foregoing described methods, the color-formulated thermoplastic polymer forms an adherent, continuous and homogeneously colored laminate on the surface of the molded article.

DESCRIPTION OF THE PREFERRED EMBODIMENTS

As previously set forth herein, the polyester-based thermosetting molding compositions which are advantageously topcoated with color-formulated thermoplastic resin in the process of this invention are the "low profile" type, i.e., those unsaturated polyester formulations which incorporate a thermoplastic polymer additive and, if internally colored, typically will produce finished moldings which are color-blotched and/or mottled in appearance. Of course, it is to be understood that polyester molding compositions without thermoplastic polymer additives may likewise be employed, if desired, with equally satisfactory results, although homogeneously colored molded parts can be produced from these formulations with internal coloration. Thus, the process of this invention affords an alternate method for coloring conventional unsaturated polyester molding compositions.

The low profile polyester compositions suitable herein contain, as the thermoplastic polymer additive, any addition-type polymer. Examples of specific suitable polymers include homopolymers of the lower alkyl esters of acrylic and methacrylic acids, e.g., methyl methacrylate, ethyl acrylate, styrene, copolymers of methyl methacrylate and lower alkyl esters of acrylic and methacrylic acids, and copolymers of methyl methacrylate with, e.g., acrylamide, methacrylamide, acrylonitrile, methacrylic acid or styrene. Also suitable thermoplastic polymers are styrene acrylonitrile copolymers, vinyl chloride-vinyl acetate copolymers and vinyl acetate homopolymer.

It is to be noted that polyester compositions which are formulated with polyethylene as the thermoplastic polymer additive and are also internally colored provide, as a rule, homogeneously colored finished molded articles with no evdience of color-blotching.

To be useful, the thermoplastic polymer should have a molecular weight ranging generally from 10,000 and preferably from 25,000 to 500,000. It is incorporated in the polyester formulation in minor amounts, e.g., from 1 to 25 parts, by weight of the total amount of resinous components in the polyester formulation.

Low profile unsaturated polyester compositions particularly adapted to color-laminating in the process of this invention contain, as part of the resin system, either a thermoplastic polymer derived from the polymerization of a monomeric mixture of vinyl chloride and vinyl acetate or a polymer derived from the mixed polymerization of vinyl chloride, vinyl acetate and an unsaturated acyclic monomer containing at least one carboxylic acid group. The preparation of these thermoplastic polymer materials, the preparation of polyester compositions incorporating them, and applications thereof in various types of polyester molding operations are disclosed respectively in copending applications Ser. No. 96,994 (Edmund Schalin, Joseph J. Dietrich, Clarence L. Sturm, Reynold A. Berkey, John R. Semancik) filed Dec. 10, 1970, for "Polymerizable Unsaturated Polyester Composition Containing Thermoplastic Additive," and Ser. No. 153,874 (John R. Semancik and Clarence L. Sturm) filed June 16, 1971, for "Improved Thermosetting Resin Compositions." The disclosures of these applications are incorporated herein by reference.

In general, any thermoplastic resin which will adhere to the surface of a formulated polyester composition may be utilized herein in combination with pigment or dye to provide the desired homogeneously colored coating on said surface. However, it is advantageous to employ those resins which can be formulated to provide coatings with good weatherability, heat and light stability, chemical resistance and/or abrasion resistance. Accordingly, specific resins which are advantageously employed include poly(vinyl chloride); copolymers of vinyl chloride with, e.g., vinyl esters of lower alkanoic acids; graft copolymers of poly(vinyl chloride) onto thermoplastic olefin-type polymer backbones; fluorocarbon resins such as poly(vinyl fluoride) and poly(vinylidene fluoride); acrylic resins such as those derived from the lower alkyl esters of acrylic and methacrylic acids; polyacrylamide; and polyamides such as nylon resins of lower softening points. Of these, the vinyl chloride homopolymers and copolymers and poly(vinylidene fluoride) are especially preferred at present. The previously described polymer material which is derived from the polymerization of vinyl chloride, vinyl acetate and an unsaturated acyclic acid, e.g., crotonic acid, may also be employed herein as the resin overlay with excellent results.

In carrying out the process of this invention, the unsaturated polyester composition is formulated as conventionally practiced in the art, preferaby into either premix or sheet molding compound stock. Premix formulations, also known as "dough molding compound," "flow mix" or "bulk molding compound (BMC)" are prepared by mixing together one or more unsaturated polyesters, an ethylenically unsaturated monomer, a thermoplastic polymer, a filler, a free-radical type initiator, a reinforcing fiber and optionally a mold release agent to form a mixture of putty-like consistency. This dough-like formulation is fed into a mold to which heat and pressure are then applied to cure the unsaturated resinous components and obtain the molded article.

As practiced herein, preparation of sheet molding compound, SMC, is carried out as previously described herein using as the resin-coated films between which the polyester composition is "sandwiched," selected colored thermoplastic resin films which are fabricated as described hereinafter. In contrast to prior practice, however, these resin films are not removed from the SMC prior to molding operations.

The thermoplastic resin which becomes laminated to the polyester surface in the process of this invention is formulated with the desired pigment, dye, etc., and optionally with light and/or thermal stabilizers for the resin. Additionally, one or more lubricants usually will be included in the formulation, particularly when the color-formulated resin is to be applied to the polyester surface in film form.

A representative thermoplastic resin formulation used herein has the following composition:

| | Parts by weight |
|---|---|
| Resin | 100 |
| Pigment | 5–20 |
| Stabilizer | 0–5 |
| Lubricant (e.g., metallic fatty acid ester, e.g., Zn stearate) | 0–15 |

The various components of the formulation are mixed together in normal dryblending cycles in low shear mixers as, e.g., a Hobart mixer, after which the dryblended material is fabricated into film or sheeting either by extrusion or hotmilling. The finished colored resin film or sheet is usually 10–15 mils in thickness. Preparation of the films or sheets is carried out by conventional methods which do not constitute a part of the present invention.

The prepared colored resin film is employed as the carrier film and the resin coated overlay film in preparing the unsaturated polyester sheet molding compound. In subsequent molding operations, proper-sized pieces of the resulting polyester film composite are positioned in the forming mold and fabrication of the finished molding is effected with heat and pressure. The softening point of the thermoplastic resin in the film overlay will govern the maximum molding temperature employed to some extent. However, molding temperatures ranging generally from about 275° F. to 360° F. and molding pressures of 50–2000 p.s.i. are satisfactory. Molding cycles of 30–300 seconds likewise are satisfactory, with times of 30–180 seconds being preferred.

To assure maximum adhesion of the thermoplastic resin film laminate on the polyester surface, it is advantageous in most instances to cool the mold substantially before removing the finished molding. Alternatively, however, additional transparent resin films may be laid over the colored resin films prior to molding operations so that the transparent films will contact the mold surface. These films which are fabricated from either thermoplastic or thermosetting resins, e.g., polyethylene terephthalate or melamine resins, have been found to adhere significantly less to a hot mold surface than the colored resin films. Moldings prepared with such transparent resin overlays thus may be removed from the forming mold quite soon after the molding cycle.

The film lamination method as outlined above is particularly adapted to the preparation of homogeneously colored molded articles which have fairly flat surfaces and are of regular configuration. Colored appliance housings and recreational vehicles are typical examples of such moldings.

It should also be noted that the film lamination method can be conveniently adapted to semi-continuous molding operations using multi-station molding equipment. After the molding cycle is completed with any particular mold, the mold is moved from the press. It is then allowed to cool and is successively emptied of the molded article and recharged with fresh molding stock before it is again positioned in the molding press.

As previously mentioned herein, the process of this invention may alternatively utilize the colored thermoplastic resin as a powder rather than as a film. In one procedure, the thermoplastic powder is applied to the surface of the polyester prior to curing operations, as described previously.

In another method, an unsaturated polyester molding composition is first molded as conventionally practiced in the art, after which the molded article is removed hot from the forming mold and contacted with colored thermoplastic resin powder. Particles of the colored resin will adhere to the hot surface of the molding and will coalesce and fuse thereon to form a continuous, adherent, homogeneously colored coating. The resin powder may be thus applied to the molding surface by methods known and used in the art for applying resinous powders to various substrates, e.g., by spraying or electrodeposition of the powder onto the surface or alternatively by immersing the hot molding into an agitating mass of the resin powder. This latter technique will be easily recognized by those skilled in the art as a fluidized resin bed coating method. It is an especially preferred method for utilizing resin powders in carrying out the process of this invention, since moldings of widely varying configuration may be suitably employed. Also, resin overlays varying widely in thickness can be most conveniently attained. Depending upon the temperature of the molding surface, the particular resin incorporated in the resin powder and the length of time the molding is immersed in the fluidized resin bed, it is possible to obtain colored thermoplastic coatings ranging from 5–50 mils in thickness, in desired. After coating of the resin powder onto the molding surface has been effected and the molding is removed from the resin bed, the temperature of the molding is usually sufficient to fuse the adhered resin particles into the desired coating. However, the coated molding may be further subjected to an elevated temperature for a very short time, to assure optimum fusion of the applied resin, particularly if it has a higher softening point.

In general, resin powder coating is carried out at approximately the same temperatures as utilized in the film lamination procedures, i.e., the temperature of the molding typically ranges from about 275° F. to 350° F. In fluidized resin bed coating procedures, immersion of the molding in the resin bed for significantly less than one minute as, e.g., for 5–30 seconds, is oftentimes sufficient to adhere the necessary quantity of resin powder to produce the coating desired.

The colored thermoplastic resin powder compositions utilized herein may be prepared by any methods now known in the art for preparing resin powders applicable as fluidizable resin powders, e.g., in U.S. Pat. 3,028,251. Specifically, the resin, coloring material and optional ingredients, such as stabilizers, lubricants, etc., may be dry-blended. The resulting dryblend may then be suitably applied or it may be further processed as, e.g., by sequential extrusion and grinding to attain a resin powder of the proper average particle size for efficient fluidization. The particular method utilized to prepare the colored resin powder per se is entirely conventional and does not constitute a part of the present invention. It should be recognized, nevertheless, that for optimum performance, the resin powder preferably should have an average particle size ranging between 40 and 325 mesh.

Low profile polyester moldings which have deep draws and/or intricate surfaces likewise are particularly adapted to color coating by fluidizable resin coating techniques.

The colored low profile polyester molded products of this invention are homogeneously colored with no evidence of the color blotching and/or mottling observed in moldings prepared from low profile polyester compositions with incorporated color. At the same time, the products of this invention likewise retain the good dimensional stability which is characteristic of low profile polyester molded products.

The following examples are given in order that those skilled in the art may more completely understand the present invention and the manner in which the same may be carried out. In these examples and elsewhere herein where proportions of ingredients are given in parts such proportions are by weight unless otherwise indicated.

EXAMPLE 1

One hundred parts of a thermoplastic polymer containing vinyl chloride, vinyl acetate and crotonic acid prepared as described in copending patent application, Ser. No. 153,974 (John R. Semancik and Clarence L. Sturm), led June 16, 1971, is mixed with the following ingredients in a Hobart mixer:

| | Quantity parts |
|---|---|
| Chrome Oxide Green X-1134 (Imperial Color, Hercules Inc.) | 20 |
| Stabilizer T-31 (M and T Chemicals Inc.) | 3 |
| Zinc stearate | 10 |

The resulting mixture is milled on a 3-roll mill at 230° F. and taken off as a 15-mil sheet.

A sheet molding compound (SMC) is prepared by first mixing together in a high shear mixer, 56 parts of a 67% solution of an unsaturated polyester in styrene, 13.5 parts of the thermoplastic polymer derived from the monomeric mixture of vinyl chloride, vinyl acetate and crotonic acid (as described above), 30.5 parts of styrene, 1.0 part of t-butylperbenzoate initiator and 30 parts of calcium stearate. Thereafter, 150 parts of calcium carbonate and 30 parts of magnesium hydroxide are slowly incorporated into the mixture with slight agitation. The prepared formulation is applied to 108 parts of 1" glass fibers, using a sheet molding compound machine.

After aging, the uncured SMC is used to mold a flat panel using the 15-mil sheet of colored thermoplastic polymer as an overlay as follows:

The uncured SMC is placed in a 12" x 12" x 0.100" matched metal die mold and the 15-mil thermoplastic polymer sheet is placed on top. The sheet composite is compression molded for 2 minutes at 300° F. and 1000 p.s.i.g. The molded part is removed from the mold. The colored overlay is found to be completely adhered to the SMC substrate. The molded part exhibits a smooth surface which is uniformly colored.

EXAMPLE 2

A colored thermoplastic polymer dryblend is prepared by mixing 100 parts of graft copolymer of poly(vinyl chloride) on an ethylene-vinyl acetate copolymer backbone (prepared as described in copending patent application, Ser. No. 180,546, filed in the name of Joseph J. Dietrich on Sept. 5, 1971, for "Vinyl Chloride Graft Polymers and Process for Preparation Thereof," which application is, in turn, a continuation-in-part of Ser. No. 761,840 (Joseph J. Dietrich), filed Sept. 23, 1968, and now abandoned, and 20 parts of chrome oxide green pigment in a high shear mixer.

This powder mixture is then applied uniformly onto the surface of a section of the SMC positioned in a 2"-diameter mold. The layer of thermoplastic powder is ⅛" thick.

The powder-coated SMC is compression molded for 2 minutes at 300° F. After cooling, the molded part is removed from the mold. Its surface is completely smooth and uniformly colored. The colored thermoplastic coating is completely bonded to the molded surface and cannot be removed.

EXAMPLE 3

The colored thermoplastic polymer prepared as set forth in Example 2 above is milled on a 3-roll mill at 230° F. and removed as a 15-mil sheet. It is then employed as the overlay for molding uncured SMC as set forth in Example 1. The finished molded part has a uniformly colored, smooth surface. The fused colored thermoplastic coating is completely adherent.

EXAMPLE 4

A colored polymer dryblend is prepared as outlined in Example 2, using poly(vinylidene fluoride) as the thermoplastic polymer. This dryblend is applied to an uncured SMC and the resulting SMC-colored polymer layer is compression molded as described in Example 2, except that the molding temperature is raised to 360° F. The finished molded part presents a uniformly colored smooth surface with complete adhesion of the colored poly(vinylidene fluoride) coating.

It is to be understood that although the invention has been described with specific reference to particular embodiments thereof, it is not to be so limited, since changes and alterations therein may be made which are within the full intended scope of this invention as defined by the appended claims.

What is claimed is:

1. A method for preparing a dimensionally stable, molded article having uniformly colored, smooth surfaces from a low profile reinforced unsaturated polyester, which method comprises sequentially:
   (a) formulating an uncured reinforced unsaturated polyester composition by mixing an unsaturated polyester, a monoethylenically unsaturated monomer copolymerizable therewith and a saturated thermoplastic polymer together with fillers, reinforcing fibers, polymerization initiator and optionally a chemical thickening agent;
   (b) applying a colored preformed sheet of a thermoplastic polymer selected from the group consisting of poly(vinyl chloride), copolymers of vinyl chloride, vinyl acetate and crotonic acid, graft copolymers of poly(vinyl chloride) onto olefinic backbone polymers, and poly(vinylidene fluoride) onto the surfaces of the uncured formulated reinforced unsaturated polyester composition; and
   (c) heating the resulting colored thermoplastic polymer-reinforced unsaturated polyester composite in a mold at a temperature of 275–360° F. and under a pressure of 50–2000 p.s.i.g. for 30–300 seconds to obtain a cured, dimensionally stable, reinforced molded article having smooth surfaces adherently bonded with a uniformly colored thermoplastic polymer laminate.

2. The method of claim 1 in which the thermoplastic polymer employed both in the profile polyester formulation and in the preformed colored polymer sheet is prepared from a monomeric mixture of vinyl chloride, vinyl acetate and crotonic acid.

3. The method of claim 1 in which the thermoplastic polymer in the preformed colored polymer sheet is a graft copolymer of poly(vinyl chloride) on an ethylene-vinyl acetate copolymer backbone.

4. The method of claim 1 in which the thermoplastic polymer in the preformed colored polymer sheet is poly(vinylidene fluoride).

5. The method of claim 1 in which molding is carried out for 30–180 seconds at a temperature of 300° F.

6. The method of claim 1 in which the saturated thermoplastic polymer component of the unsaturated polyester composition is a copolymer containing, by weight, from about 15 to 85 percent of vinyl chloride and from 15 to 85 percent of vinyl acetate.

7. The method of claim 1 in which the saturated thermoplastic polymer component of the unsaturated polyester composition is a copolymer of vinyl chloride, vinyl acetate and crotonic acid.

References Cited
UNITED STATES PATENTS

| | | | |
|---|---|---|---|
| 2,817,619 | 12/1957 | Bickel et al. | 264—245 |
| 2,796,634 | 6/1957 | Chellis | 264—257 |
| 3,265,556 | 8/1966 | Hungerford et al. | 161—195 |
| 3,520,750 | 7/1970 | Hsin Li et al. | 24—236 |
| 3,115,386 | 12/1963 | Zentmyer | 264—171 |
| 3,375,311 | 3/1968 | Franze | 264—171 |
| 3,002,231 | 10/1961 | Walker et al. | 156—245 |
| 3,051,679 | 8/1962 | Forsyth | 264—128 |
| 3,129,110 | 4/1964 | Anderson | 260—862 |
| 3,216,877 | 11/1965 | Mohr | 264—338 |
| 3,701,748 | 10/1972 | Kroekel | 264—331 |

ROBERT F. WHITE, Primary Examiner

J. R. THURLOW, Assistant Examiner

U.S. Cl. X.R.

156—245; 260—862; 264—331, 338